(12) United States Patent
Song et al.

(10) Patent No.: US 7,426,071 B2
(45) Date of Patent: Sep. 16, 2008

(54) ELECTROCHROMIC DEVICE HAVING THE FUNCTIONALITY OF A SECONDARY BATTERY AND MANUFACTURING METHOD THEREOF

(75) Inventors: Ki Yong Song, Seoul (KR); Sung Hen Cho, Seoul (KR); Chang Ho Noh, Suwon-si (KR); Jin Young Kim, Suwon-si (KR); Jong Min Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 136 days.

(21) Appl. No.: 11/501,343

(22) Filed: Aug. 9, 2006

(65) Prior Publication Data

US 2007/0092793 A1    Apr. 26, 2007

(30) Foreign Application Priority Data

Oct. 26, 2005    (KR) .................... 10-2005-0101359

(51) Int. Cl.
    *G02B 26/00* (2006.01)
(52) U.S. Cl. ..................................... 359/265; 359/267

(58) Field of Classification Search ................. 359/238, 359/240, 243, 260, 265; 345/107
See application file for complete search history.

(56) References Cited

U.S. PATENT DOCUMENTS 6,104,372 A    8/2000    Lindquist et al. ............ 345/104

FOREIGN PATENT DOCUMENTS

| DE | 19735803 A1 * | 2/1999 |
|---|---|---|
| JP | 9-244072 | 9/1997 |
| JP | 2002-287173 | 10/2002 |

* cited by examiner

*Primary Examiner*—Timothy Thompson
(74) *Attorney, Agent, or Firm*—Cantor Colburn LLP

(57) ABSTRACT

Disclosed herein is an electrochromic device having the functionality of a secondary battery. The electrochromic device includes a plurality of secondary battery/display segments in which a double metal oxide layer comprising mesoporous metal oxide particles and macroporous metal oxide particles is disposed on a transparent electrode, and a cathode active material for a lithium secondary battery is disposed on a counter electrode to enable oxidation and reduction of lithium. Methods of manufacturing the electrochromic device are disclosed as well.

23 Claims, 2 Drawing Sheets

Cyclic Voltammogram

ELECTROCHROMIC DEVICE HAVING THE FUNCTIONALITY OF A SECONDARY BATTERY AND MANUFACTURING METHOD THEREOF

This non-provisional application claims priority to Korean Patent Application No. 2005-101359 filed on Oct. 26, 2005 and all the benefits accruing therefrom under 35 U.S.C. § 119, the contents of which are herein incorporated by reference in its entirety.

BACKGROUND OF THE INVENTION

1. Field of the Invention

The present invention relates to an electrochromic device having the functionality of a secondary battery and a method for manufacturing the device. More particularly, the present invention relates to an electrochromic device in which a double metal oxide layer including mesoporous metal oxide particles and macroporous metal oxide particles is disposed on a transparent electrode to provide improved contrast to the device, and a cathode active material for a lithium secondary battery is disposed on a counter electrode to allow the device to function as a lithium secondary battery.

2. Description of the Related Art

Electrochromic devices are devices whose constituent materials are stimulated by external stimuli to cause chemical or physical changes in molecular structure and induce visual electrochromic effects. When an external electrical stimulus is applied to a transparent electrode and a counter electrode between which an electrolyte is filled to create a potential difference between the electrodes, ions and electrons contained in the electrolyte migrate into an electrochromic layer to participate in a redox reaction, thus causing visual changes in color or shade. Electrochromic devices are currently used in information processing, including recording, display and output of information, because of their ability to control optical properties.

Current electrochromic devices suffer from low contrast and/or long response times. There accordingly remains a need in the art for improved electrochromic devices.

SUMMARY OF THE INVENTION

The present invention overcomes the problems of the prior art, and one aspect of the present invention includes providing an electrochromic device having the functionality of a lithium secondary battery and improved contrast that is suitable for use as an electrochromic display.

Another aspect of the present invention includes providing an electrochromic device which further includes a plurality of photovoltaic cell segments and/or a plurality of lithium secondary battery segments in the same plane as the electrochromic device, thereby minimizing or eliminating the need for an external energy source.

In accordance with an exemplary embodiment of the present invention, an electrochromic device having the functionality of a secondary battery includes a plurality of secondary battery/display segments. Each of the segments includes a transparent electrode; a double metal oxide layer including mesoporous metal oxide particles and macroporous metal oxide particles diposed on the transparent electrode; a counter electrode arranged opposite to the transparent electrode; a cathode active material disposed on the counter electrode; and an electrolyte disposed in a space between the transparent electrode and the counter electrode.

The electrochromic device may also include a plurality of photovoltaic cell segments and/or a plurality of lithium secondary battery segments in the same plane as the secondary battery/display segments.

In accordance with another exemplary embodiment of the present invention, a method of manufacturing the electrochromic device includes disposing a double metal oxide layer comprising mesoporous metal oxide particles and macroporous metal oxide particles on a transparent electrode; disposing a cathode active material on a counter electrode; placing the counter electrode opposite the transparent electrode; and disposing an electrolyte in a space between the transparent electrode and the counter electrode to form a secondary battery segment.

The method of manufacturing the electrochromic device may also include disposing a photovoltaic cell segment and/or a lithium secondary battery segment in the same plane as the secondary battery segment.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF THE INVENTION

Figure 1:
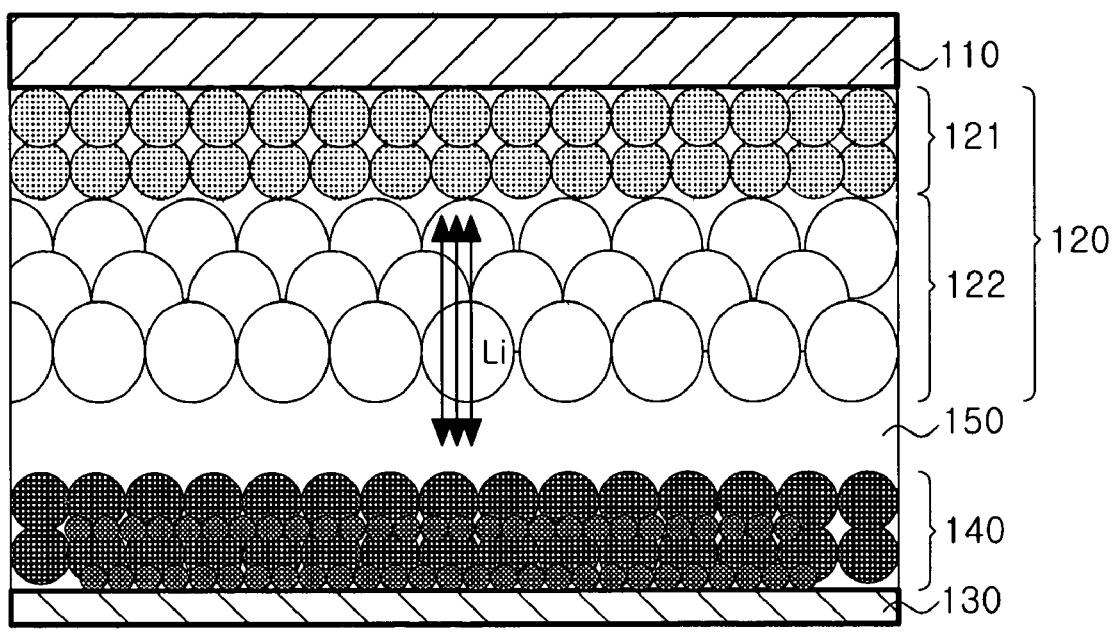
FIG. 1 is a partial cross-sectional schematic view of an exemplary embodiment of an electrochromic device according to the present invention.

The present invention will now be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The electrochromic device having the functionality of a secondary battery generally comprises a plurality of secondary battery/display segments, wherein each of the segments includes a transparent electrode, a double metal oxide layer comprising mesoporous metal oxide particles and macroporous metal oxide particles disposed on the transparent electrode, a counter electrode arranged opposite to the transparent electrode, a cathode active material disposed on the counter electrode, and an electrolyte disposed in a space between the transparent electrode and the counter electrode.

The double metal oxide layer can function as a separator for insulating the counter electrode from the transparent electrode and serves to improve the chromatic contrast of the electrochromic device. The cathode active material disposed on the counter electrode causes a display area to be in the charged state and a background area to be in the discharged state of the battery, thus providing the functionality of a display in the charged state.

FIG. 1 is a partial cross-sectional schematic view illustrating an exemplary embodiment of an electrochromic device according to the present invention. Each secondary battery/display segment of the electrochromic device shown in FIG. 1 includes a transparent electrode 110, a double metal oxide layer 120 comprising the mesoporous metal oxide particles and the macroporous metal oxide particles disposed on the transparent electrode 110, a counter electrode 130 opposite the transparent electrode 110, a cathode active material 140 disposed on the counter electrode 130, and an electrolyte 150 disposed in the space between the transparent electrode 110 and the counter electrode 130.

The transparent electrode 110 can be formed by coating an electrically conductive material on a substrate. Any type of substrate may be used as long as it is transparent. Exemplary substrates include transparent inorganic substrates, (e.g., quartz, glass, or the like) and transparent polymeric substrates (e.g., polyethylene terephthalate (PET), polyethylene naphthalate (PEN), polycarbonate, polystyrene, polypropylene, or the like). Exemplary conductive materials that can be coated on the substrate include tin-doped indium oxide (ITO), fluorine-doped tin oxide (FTO), $ZnO-Ga_2O_3$, $ZnO-Al_2O_3$, $SnO_2-Sb_2O_3$, or the like.

The metal oxide layer 120 disposed on the transparent electrode 110 comprises at least one kind of metal oxide having different particle sizes. Specifically, the metal oxide layer 120 has a double layer structure comprising a layer of the mesoporous metal oxide particles 121 and a layer of the macroporous metal oxide particle 122.

The mesoporous metal oxide particle layer 121 is the portion where color changes occur owing to intercalation/deintercalation of lithium ions. Lithium ions generated in the electrolyte 150 migrate into the metal oxide layer 120 via an externally applied voltage and are intercalated into the surface of the mesoporous metal oxide particle layer 121. The sudden difference in the density of the lithium ions in the mesoporous metal oxide particle layer 121 induces the electrochromic effects. For improved efficiency, the surface area of the metal oxide layer 120 is extended to that of semiconductors by using porous metal oxide particles. The mesoporous metal oxide particles desirably have a small size and a high porosity. In an exemplary embodiment, the mesoporous metal oxide particles have an average longest dimension of about 5 to about 50 nanometers (nm).

The macroporous metal oxide particle layer 122 acts as a separator for insulating the counter electrode from the transparent electrode. In addition, the macroporous metal oxide particle layer 122 scatters light passed through the mesoporous metal oxide particle layer 121 in order to improve the contrast of the mesoporous metal oxide particle layer 121. In an exemplary embodiment, the macroporous metal oxide particles have an average longest dimension of about 100 to about 400 micrometers ($\mu$m).

Exemplary metal oxides that can be used in the macroporous metal oxide particle layer 122 and/or the mesoporous metal oxide particle layer 121 include, but are not limited to, titanium oxide, niobium oxide, hafnium oxide, indium oxide, tin oxide, zinc oxide, or the like. These oxides may be used alone or in a combination comprising at least one of them. In an exemplary embodiment, titanium oxide ($TiO_2$) particles are used in one or both layers of the metal oxide layer 120.

The counter electrode 130 can be produced by uniformly coating a metal on a surface of the electrochromic device. The counter electrode 130 can comprise an electrically conductive material. If a conductive layer is disposed on the surface of the counter electrode 130 facing the transparent electrode 110, the counter electrode 130 may comprise an insulating material. Desirably, the counter electrode 130 comprises an electrochemically stable material, of which platinum, gold, and carbon are exemplary examples.

In an exemplary embodiment, for improved catalytic effects of oxidation and reduction, the surface of the counter electrode 130 facing the transparent electrode 110 comprises a microstructure with a high surface area. For example, the counter electrode can include platinum black or porous carbon. A platinum black counter electrode 130 can be produced by anodic oxidation of platinum or treatment with hexachloroplatinate. A porous carbon counter electrode 130 can be produced by sintering fine carbon particles or baking an organic polymer.

As described above, the cathode active material 140 is disposed on the counter electrode 130. The cathode active material 140 enables oxidation and reduction of lithium and allows the electrochromic device to function as a secondary battery.

In an exemplary embodiment, the cathode active material 140 is a lithium-containing metal oxide. Any lithium-containing metal oxide may be used. Examples of suitable lithium-containing metal oxides include $LiCoO_2$, $LiMn_xO_{2x}$ (wherein x is 1 or 2), $LiNi_{1-x}Mn_xO_2$ (wherein $0 \leq x \leq 1$), $LiNi_{1-x}Co_xO_2$ (wherein $0 \leq x \leq 1$), $LiNi_{1-x-y}Co_xMn_yO_2$ (wherein $0 \leq x \leq 0.5$ and $0 \leq y \leq 0.5$), and $LiFeO_2$. Particularly exemplary lithium-containing metal oxides that enable oxidation and reduction of lithium include $LiMn_2O_4$, $LiCoO_2$, $LiNiO_2$, and $LiFeO_2$.

The cathode active material 140 can be prepared by mixing the lithium-containing metal oxide, a conductive agent, and a binder, in a solvent. The solution is directly coated on the counter electrode and dried to form the cathode active material 140 on the counter electrode 130. Alternatively, the solution can be cast on a substrate, and subsequently peeled off the substrate after drying. The peeled-off film of the cathode active material 140 can then be laminated on the counter electrode 130.

In an exemplary embodiment, carbon black is used as the conductive agent. In an exemplary embodiment, the binder is a vinylidene fluoride-hexafluoropropylene copolymer, polyvinylidenefluoride, polyacrylonitrile, polymethylmethacrylate, polytetrafluoroethylene or a mixture thereof, or a styrene butadiene rubber polymer. The solvent can be N-methylpyrrolidone, acetone, water, or the like. The amounts of the cathode active material, conductive agent, binder, and solvent can be determined by one of ordinary skill in the art in view of this disclosure without undue experimentation.

Any electrolyte 150 may be used without limitation as long as it exhibits a hole conductivity. The use of a polymeric hole conductor as the electrolyte 150 enables the manufacture of flexible film type electrochromic devices.

The electrolyte 150 generally comprises an electrolytic solution, for example, a solution of a lithium salt in an appropriate solvent. The lithium salt can be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), $LiCl$, $LiI$, or a combination comprising at least one of the foregoing salts. The solvent can be propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methyl ethyl carbonate, methyl isopropyl carbonate, ethyl propyl carbonate, dipropyl carbonate, dibutyl carbonate, diethylene glycol, dimethyl ether, or a combination comprising at least one of the foregoing solvents.

The electrochromic device may further comprise a plurality of photovoltaic cell segments and/or lithium secondary battery segments in the same plane as the secondary battery/display segments. For example, energy can be generated from the photovoltaic cell segments and stored in the lithium secondary battery segments, thus enabling display of information through the electrochromic device. In this manner, the electrochromic device can advantageously be utilized as an independent display without the need for an external energy source.

Figure 2:
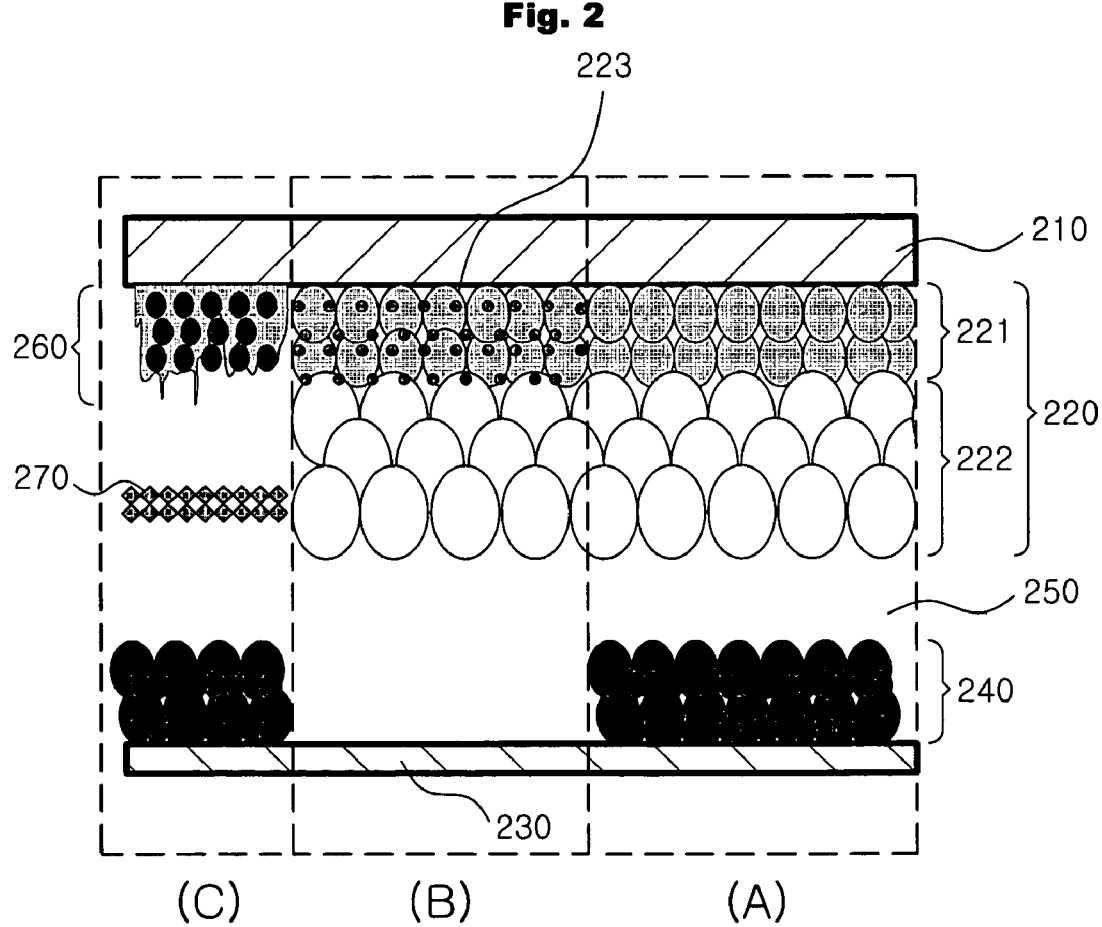
FIG. 2 is a partial cross-sectional schematic view of another exemplary embodiment of an electrochromic device according to the present invention.

FIG. 2 is a partial cross-sectional schematic view illustrating an exemplary embodiment of an electrochromic device comprising a plurality of photovoltaic cell segments and a plurality of lithium secondary battery segments. The photovoltaic cell segments and the lithium secondary battery segments are in the same plane as the secondary battery/display segments and are in electrical communication with one another.

The electrochromic device shown in FIG. 2 is characterized in that common elements between the secondary battery/display segments and the photovoltaic cell segments or the lithium secondary battery segments are integrated. For example, the common elements between the secondary battery/display segments and the photovoltaic cell segments include a transparent electrode, a light-absorbing layer, a counter electrode, and an electrolyte. The common elements between the secondary battery/display segments and the lithium secondary battery segments include a cathode, an anode, a cathode active material, and an electrolyte. As a result of the integration of the common elements, the electrochromic device also has the functionalities of a photovoltaic cell and a secondary battery.

In the electrochromic device shown in FIG. 2 the plurality of photovoltaic cell segments are generally represented by (B) and are in the same plane as the secondary battery/display segments, which are generally represented by A. Each of the photovoltaic cell segments (B) includes a transparent electrode 210, a double metal oxide layer 220 comprising mesoporous metal oxide particles and macroporous metal oxide particles disposed on the transparent electrode 210, a counter electrode 230 disposed opposite to the transparent electrode 210, and an electrolyte 250 disposed in a space between the transparent electrode 210 and the counter electrode 230.

The transparent electrode 210, the counter electrode 230, the electrolyte 250, and the metal oxide layer 220 of the photovoltaic cell segments (B) are used in common with those of the secondary battery/display segments (A).

The metal oxide layer 220, acting as a light-absorbing layer of the photovoltaic cell segments (B) can be formed by adsorbing a dye 223 on the surface of the metal oxide particles. The dye 223 absorbs light and undergoes electronic transitions from a ground state to an excited state to generate electron-hole pairs. The excited electrons are injected into a conduction band (CB) of the metal oxide layer 220 and migrate into the electrodes to generate an electromotive force.

Any known dye 223 used in existing photovoltaic cells can be used. Exemplary dyes 223 include ruthenium complexes. Alternatively, or in addition to ruthenium complexes, a colorant may be used if it has charge separation functions and exhibits photosensitive functions. Suitable colorants include xanthene-type colorants such as Rhodamine B, Rose Bengal, eosin, or erythrosine; cyanine-type colorants such as quinocyanine and cryptocyaninei; basic dyes such as phenosafranine, Capri blue, thiosine, or Methylene Blue; C porphyrin-type compounds such as chlorophyll, zinc porphyrin, or magnesium porphyrin; azo colorants; phthalocyanine compounds; complex compounds such as ruthenium trisbipyridyl; anthraquinone-type colorants; polycyclic quinone-type colorants; or the like; or a combination comprising at least one of the foregoing colorants.

In the electrochromic device shown in FIG. 2 the plurality of lithium secondary battery segments, generally represented by (C), are in the same plane as the secondary battery/display segments (A). Each of the lithium secondary battery segments (C) includes an electrode 210, an anode active material 260 disposed on the electrode 210 to enable intercalation/deintercalation of lithium ions, a counter electrode 230 opposite the electrode 210, a cathode active material 240 disposed on the counter electrode 230, a separator 270 interposed between the electrode 210 and the counter electrode 230, and an electrolyte 250 disposed in a space between the electrode 210 and the counter electrode 230.

The electrode 210, the counter electrode 230, the cathode active material 240, and the electrolyte 250 of the lithium secondary battery segments (C) are used in common with those of the secondary battery/display segments (A).

As the anode active material 260 of the lithium secondary battery segments (C), lithium, a lithium alloy, a carbon material, or a graphite material can be used to enable intercalation and deintercalation of lithium ions.

The separator 270 is interposed between the transparent electrode 210 and the counter electrode 230 to insulate the electrodes. Any known separator used in lithium batteries may be used. In an exemplary embodiment, the separator 270 has a low resistance to the migration of ions in the electrolyte 250 and superior impregnation ability with the electrolytic solution. Specifically, the separator 270 may comprise glass fibers, polyester, Teflon, polyethylene, polypropylene, polytetrafluoroethylene (PTFE), and combinations thereof, and may be in a non-woven or woven fabric form. More specifically, a rollable separator 270 comprising a material such as polyethylene or polypropylene is used when the lithium secondary battery is a lithium ion battery, while a separator 270 having superior impregnation ability with an organic electrolytic solution is used when the lithium secondary battery is a lithium ion polymer battery.

The present invention will now be described in detail with reference to the following example. It is to be understood, however, that the example is for illustrative purposes only and is not to be construed to limit the scope of the invention.

EXAMPLE 1

After fluorine-doped tin oxide (FTO) was applied to a glass substrate by sputtering, a paste of $TiO_2$ particles having an average particle diameter of about 9 nm was applied thereto by screen printing and dried at 70 degrees Celsius (°C.) for 30 minutes. Subsequently, a paste of $TiO_2$ particles having an average particle diameter of about 300 μm was applied to the previously applied $TiO_2$ paste and dried by the same procedure as above. The resulting structure was placed in an electric furnace, heated at a rate of 3° C./minute in air, maintained at 450° C. for 30 minutes, and cooled at a rate of 3° C./minute. A porous $TiO_2$ film having a thickness of about 30 μm was laminated on the cooled structure to form a double metal oxide layer.

Separately, a commercially available CoO powder, having the rock salt structure and an average diameter of about 12 μm, was mixed with LiOH so that the molar ratio of cobalt to lithium was 1:1. The mixture was annealed at 850° C. for 15 hours and vacuum dried to prepare $LiCoO_2$ having a water content of about 200 parts per million (ppm) or less. 96 weight percent (wt. %) $LiCoO_2$, 2 wt. % PVDF as a binder, and 2 wt. % of a carbon conductive agent for improving the migration of electrons were mixed together. After addition of 100 milliliters (ml) of N-methylpyrrolidone and ceramic balls, the resulting mixture was kneaded to prepare a slurry. The slurry was applied to a thickness of about 200 μm to a platinum thin film using a doctor blade, dried, and again dried at 100° C. under vacuum to produce a counter electrode having a $LiCoO_2$ layer formed thereon.

A fine hole for injection of an electrolyte was formed on the surface of the counter electrode using a drill having a diameter of about 0.75 millimeters (mm). An electrolyte was filled into a space formed between the two electrodes through the hole to manufacture an electrochromic device. As the electrolyte, a 1.15 mole per liter (M) solution of $LiPF_6$ in a mixture of ethylene carbonate (EC)/propylene carbonate (PC)/dimethyl carbonate (DMC) in a volumetric ratio of 3/4/1 was used.

[Evaluation of Characteristics of Electrochromic Device]

After an external circuit was connected to both electrodes, a voltage of 6.5 volts (V) was applied to evaluate the electrical properties of the electrochromic device manufactured in Example 1.

The electrochromic device was colorless in a standby state, but changes in color were distinctly observed when the amount of electric current flowing between the electrodes in response to the applied voltage was measured.

Figure 3:
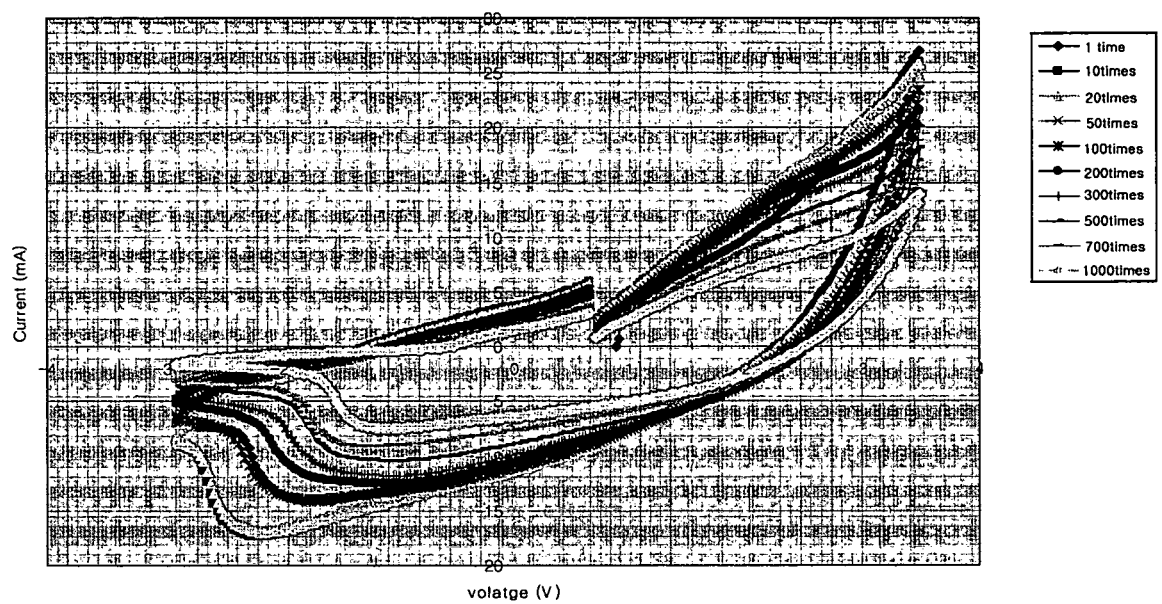
FIG. 3 is a cyclic voltammogram showing for an exemplary electrochromic device manufactured according to Example 1 of the present invention.

The cyclic voltammogram of the electrochromic device was measured, and the results are shown in FIG. 3. The results demonstrate that the electrochromic device presents reliable operating results even after 1,000 cycles of sweeping.

As apparent from the above description, the electrochromic device of the present invention can include a cathode active material for a lithium secondary battery formed on a counter electrode to allow the device to have the functionality of a lithium secondary battery. In addition, the electrochromic device of the present invention can include a double metal oxide layer comprising at least one metal oxide having different particle sizes, acting as a separator between a counter electrode and a transparent electrode and serving to improve the contrast of the device.

Furthermore, since the electrochromic device of the present invention may further comprise a plurality of photovoltaic cell segments and/or a plurality of lithium secondary battery segments provided in the same plane, it can be utilized as an independent display without needing any external energy.

Although the present invention has been described herein with reference to exemplary embodiments, these exemplary embodiments do not serve to limit the scope of the present invention. Accordingly, those skilled in the art to which the present invention pertains will appreciate that various modifications are possible, without departing from the scope and spirit of the invention as disclosed in the appended claims. Accordingly, such modifications and variations are intended to come within the scope of the appended claims.

What is claimed is:

1. An electrochromic device, comprising:
   a plurality of secondary battery/display segments, wherein each of the secondary battery/display segments comprises:
   a transparent electrode;
   a double metal oxide layer comprising mesoporous metal oxide particles and macroporous metal oxide particles disposed on the transparent electrode;
   a counter electrode opposite the transparent electrode;
   a cathode active material disposed on the counter electrode; and
   an electrolyte disposed in a space between the transparent electrode and the counter electrode; wherein the electrochromic device has a functionality of a secondary battery.

2. The electrochromic device according to claim 1, wherein the mesoporous metal oxide particles have an average longest dimension of about 5 to about 50 nanometers.

3. The electrochromic device according to claim 1, wherein the macroporous metal oxide particles have an average longest dimension of about 100 to about 400 micrometers.

4. The electrochromic device according to claim 1, wherein the metal oxide of the macroporous metal oxide particles and/or the mesoporous metal oxide particles is selected from the group consisting of titanium oxide, niobium oxide, hafnium oxide, indium oxide, tin oxide, zinc oxide, and a combination comprising at least one of the foregoing metal oxides.

5. The electrochromic device according to claim 1, wherein the cathode active material comprises $LiCoO_2$, $LiMn_xO_{2x}$, (wherein x is 1 or 2), $LiNi_{1-x}Mn_xO_2$ (wherein $0 \leq x \leq 1$), $LiNi_{1-x}Co_xO_2$ (wherein $0 \leq x \leq 1$), $LiN_{1-x-y}Co_xMn_yO_2$ (wherein $0 \leq x \leq 0.5$, $0 \leq y \leq 0.5$), $LiFeO_2$, or a combination comprising at least one of the foregoing materials.

6. The electrochromic device according to claim 1, wherein the electrolyte is a hole-conductive polymeric electrolyte.

7. The electrochromic device according to claim 1, further comprising a plurality of photovoltaic cell segments in the same plane as the secondary battery/display segments wherein each photovoltaic cell segment comprises:
   a transparent electrode;
   a double metal oxide layer comprising mesoporous metal oxide particles and macroporous metal oxide particles disposed on the transparent electrode;
   a counter electrode opposite the transparent electrode; and
   an electrolyte disposed in a space between the transparent electrode and the counter electrode.

8. The electrochromic device according to claim 1, further comprising a plurality of lithium secondary battery segments in the same plane as the secondary battery/display segments, wherein each lithium secondary battery segment comprises:
   an electrode;
   an anode active material disposed on the electrode to enable intercalation/deintercalation of lithium ions;
   a counter electrode opposite the electrode;
   a cathode active material disposed on the counter electrode;
   a separator disposed between the electrode and the counter electrode; and
   an electrolyte disposed in a space between the electrode and the counter electrode.

9. The electrochromic device according to claim 1, further comprising:
   a plurality of photovoltaic cell segments in the same plane as the secondary battery/display segments, wherein each of the photovoltaic cell segments comprises a transparent electrode, a double metal oxide layer comprising mesoporous metal oxide particles and macroporous metal oxide particles disposed on the transparent electrode, a counter electrode opposite the transparent electrode, and an electrolyte disposed in a space between the transparent electrode and the counter electrode; and
   a plurality of lithium secondary battery segments in the same plane as the secondary battery/display segments, wherein each of the lithium secondary battery segments comprises an electrode, an anode active material disposed on the electrode to enable intercalation/deintercalation of lithium ions, a counter electrode opposite the electrode, a cathode active material disposed on the counter electrode, a separator disposed between the electrode and the counter electrode, and an electrolyte disposed in a space between the electrode and the counter electrode.

10. The electrochromic device according to claim 1, wherein the anode active material comprises lithium, lithium alloys, carbon materials, graphite materials, or a combination comprising at least one of the foregoing materials.

11. A method of making an electrochromic device having a functionality of a secondary battery, the method comprising:
    disposing a first double metal oxide layer comprising mesoporous metal oxide particles and macroporous metal oxide particles on a transparent electrode;
    disposing a first cathode active material on a counter electrode;
    placing the counter electrode opposite the transparent electrode; and
    disposing an electrolyte in a space between the transparent electrode and the counter electrode to form a first secondary battery segment.

12. The method of claim 11, further comprising:
    disposing a second double metal oxide layer comprising mesoporous metal oxide particles and macroporous metal oxide particles on the transparent electrode; and
    disposing a second cathode active material on the counter electrode to form a second secondary battery segment in a same plane as the first secondary battery segment.

13. The method of claim 11, further comprising coating an electrically conductive material on a substrate to form the transparent electrode.

14. The method of claim 11, wherein disposing the first and/or second cathode active material on the counter electrode comprises:
    mixing a lithium-containing metal oxide, a conductive agent, and a binder in a solvent to form a solution;
    casting the solution on the counter electrode; and
    drying the cast solution on the counter electrode.

15. The method of claim 11, wherein disposing the first and/or second cathode active material on the counter electrode comprises:
    mixing a lithium-containing metal oxide, a conductive agent, and a binder in a solvent to form a solution;
    casting the solution on a substrate;
    drying the cast solution on the substrate to form a film;
    peeling the film off the substrate; and
    laminating the peeled film on the counter electrode.

16. The method of claim 11, further comprising disposing a photovoltaic cell segment in the same plane as the first secondary battery segment, wherein disposing the photovoltaic cell segment comprises disposing a third double metal oxide layer on the transparent electrode, wherein the third double metal oxide layer comprises mesoporous metal oxide particles, macroporous metal oxide particles, and a dye adsorbed onto a surface of the mesoporous metal oxide particles and/or the macroporous metal oxide particles.

17. The method of claim 11, further comprising disposing a lithium secondary battery segment in the same plane as the first secondary battery segment, wherein disposing the lithium secondary battery segment comprises:
    disposing an anode active material on the transparent electrode to enable intercalation/deintercalation of lithium ions;
    disposing a third cathode active material on the counter electrode; and
    disposing a separator between the transparent electrode and the counter electrode.

18. The method of claim 11, further comprising disposing the photovoltaic cell segment and the lithium secondary battery segment in the same plane as the first secondary battery segment.

19. The method of claim 11, wherein the mesoporous metal oxide particles have an average longest dimension of about 5 to about 50 nanometers.

20. The method of claim 11, wherein the macroporous metal oxide particles have an average longest dimension of about 100 to about 400 micrometers.

21. The method of claim 11, wherein the metal oxide of the macroporous metal oxide particles and/or the mesoporous metal oxide particles is selected from the group consisting of titanium oxide, niobium oxide, hafnium oxide, indium oxide, tin oxide, zinc oxide, and a combination comprising at least one of the foregoing metal oxides.

22. The method of claim 11, wherein the cathode active material comprises $LiCoO_2$, $LiMn_xO_{2x}$ (wherein x is 1 or 2), $LiNi_{1-x}Mn_xO_2$ (wherein $0 \leq x \leq 1$), $LiNi_{1-x}Co_xO_2$ (wherein $0 \leq x \leq 1$), $LiNi_{1-x-y}Co_xMn_yO_2$ (wherein $0 \leq x \leq 0.5$, $0 \leq y \leq 0.5$), $LiFeO_2$, or a combination comprising at least one of the foregoing materials.

23. The method of claim 11, wherein the electrolyte is a hole-conductive polymeric electrolyte.

* * * * *